United States Patent [19]
Drummond

[11] Patent Number: 4,948,126
[45] Date of Patent: Aug. 14, 1990

[54] EVENT ADJUDICATOR AND INTERFACE

[76] Inventor: Malcolm J. Drummond, 10 Purkiss St., Cannington, Australia, 6107

[21] Appl. No.: 23,808

[22] PCT Filed: Jun. 11, 1986

[86] PCT No.: PCT/AU86/00168
§ 371 Date: Feb. 10, 1987
§ 102(e) Date: Feb. 10, 1987

[87] PCT Pub. No.: WO86/07277
PCT Pub. Date: Dec. 18, 1986

[30] Foreign Application Priority Data
Jun. 13, 1985 [AU] Australia .................. PH1017

[51] Int. Cl.$^5$ .............................................. A63F 9/22
[52] U.S. Cl. ..................... 273/1 GC; 273/1 GE; 273/1 E; 273/85 G; 273/DIG. 28; 434/352
[58] Field of Search ............... 273/1 E, 1 GC, 1 GE, 273/85 G, 138 H, DIG. 28; 434/352; 340/707

[56] References Cited
U.S. PATENT DOCUMENTS

| Re. 32,282 | 11/1986 | Baer | 273/DIG. 28 |
| 3,728,480 | 4/1973 | Baer | 273/DIG. 28 |
| 3,763,577 | 10/1973 | Goodson | 434/352 |
| 4,395,045 | 7/1983 | Baer | 273/DIG. 28 |
| 4,592,546 | 6/1986 | Fascenda et al. | 273/DIG. 28 |
| 4,593,904 | 6/1986 | Graves | 273/DIG. 28 |
| 4,602,907 | 7/1986 | Foster | 273/DIG. 28 |
| 4,654,700 | 3/1987 | Baer | 273/DIG. 28 |

Primary Examiner—Leo P. Picard

[57] ABSTRACT

An event adjudicator (10) comprising a first event register (14) capable of registering the occurrence of each of a plurality of local events, a second event register (16) capable of registering the occurrence of one or more remote events, which local and remote events constitute a group of events, an adjudicator (12) capable of determining which event of the group of events occurred first and providing an output accordingly. An interface (16) comprising a sensor (V1, 20) arranged to sense an actuating signal from a television unit (66) and a controller (22, 24) to produce a control signal correspondent with the actuating signal.

7 Claims, 6 Drawing Sheets

FIG. 3

EVENT ADJUDICATOR AND INTERFACE

DESCRIPTION

The present invention relates to an event adjudicator and interface particularly envisaged for use in adjudicating which event of a plurality of events occurred first.

FIELD OF THE INVENTION

In general, adjudication of events has been restricted to local events occuring in close proximity to each other. For example the events to be adjudicated could be the acuation of answer buttons by contestants in a television quiz program to register which contestant was first to answer a passed question.

Such adjudication systems have not allowed for the inclusion of remote events occuring at a distance from any local events.

SUMMARY OF THE INVENTION

The present invention provides an event adjudicator and interface capable of adjudicating the occurance of local events and remote events.

In accordance with one aspect of the present invention there is provided an event adjudicator characterized in that it comprises a first event registering means capable of registering the occurrence of each of a plurality of local events, a second event registering means capable of registering the occurrence of one or more remote events, which local and remote events constitute a group of events, an adjudicator means capable of determining which event of the group of events occurred first and providing an output accordingly.

Preferably, the second event registering means is capable of registering remote events presented to the event adjudicator of the present invention by a communication system such as, for example, a television broadcasing system, or a radio communication system, or a telephone system or the like. In such manner, events originating remotely of the event adjudicator are termed remote events.

Preferably, the event adjudicator is arranged for use in conjunction with a television set that is capable of receiving a television program in which a contest in which speed in answering questions or the like is crucial.

Contestants in the television program preferably register their knowledge of the answer to a question with the second event registering means as fast as possible in order to be the contestant given the opportunity to answer correctly the question in order to gain a prize or other valuable consideration.

In such an arrangement the contestants in the television quiz program constitute the originators of the remote events.

Preferably, the local events are originated by contestants situated locally with respect to the event adjudicator of the present invention. The local contestants also register their knowledge of the answer to the questions or the like with the first event registering means as fast as possible in order to be the first local contestant or first contestant overall to be registered.

Preferably, once one contestant has registered his knowledge of the answer no other contestant may be registered.

Preferably, contestants register by actuating a switch or the like to provide a representation to the first or the second event registering means.

In accordance with a further aspect of the present invention there is provided an interface comprising a sensor means arranged to receive an actuating signal from a television unit and means to produce a control signal correspondent with the actuating signal.

The present invention will hereinafter be described with particular reference to a quiz contest broadcast on a television network, although it is to be understood that it is of general applicability.

BRIEF DESCRIPTION OF THE DRAWINGS

The present invention will now be described by way of example with reference to the accompanying drawings, in which.

DESCRIPTION OF THE INVENTION

Figure 1:
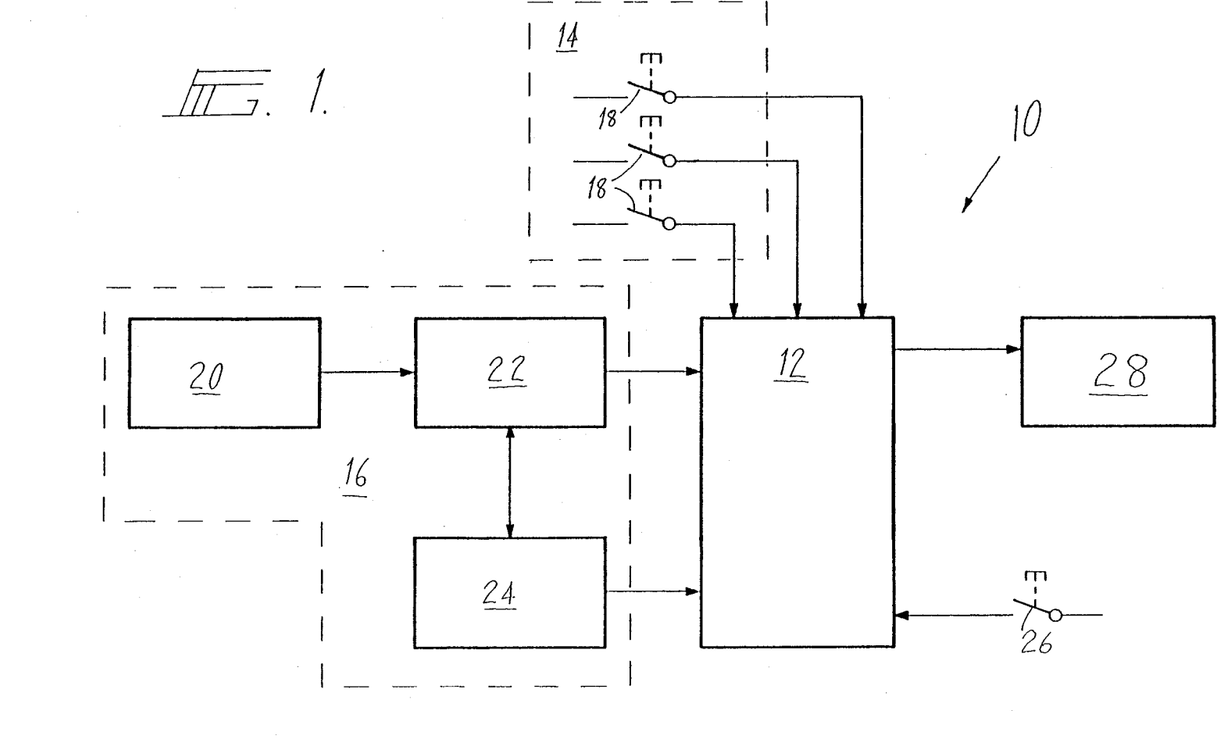
FIG. 1 is a block diagram of an event adjudicator in accordance with the present invention.

In FIG. 1 there is shown an event adjudicator 10, comprising an adjudicator means 12, a first event registering means 14 and a second event registering means 16.

The first event registering means 14 comprises a plurality of switches 18, or the like actuators to register an event with the first event registering means 14, such as, for example, three switches 18.

The second event registering means 16 comprises a sensor means 20, a pulse detector 22 and a missing pulse detector 24.

Figure 2:
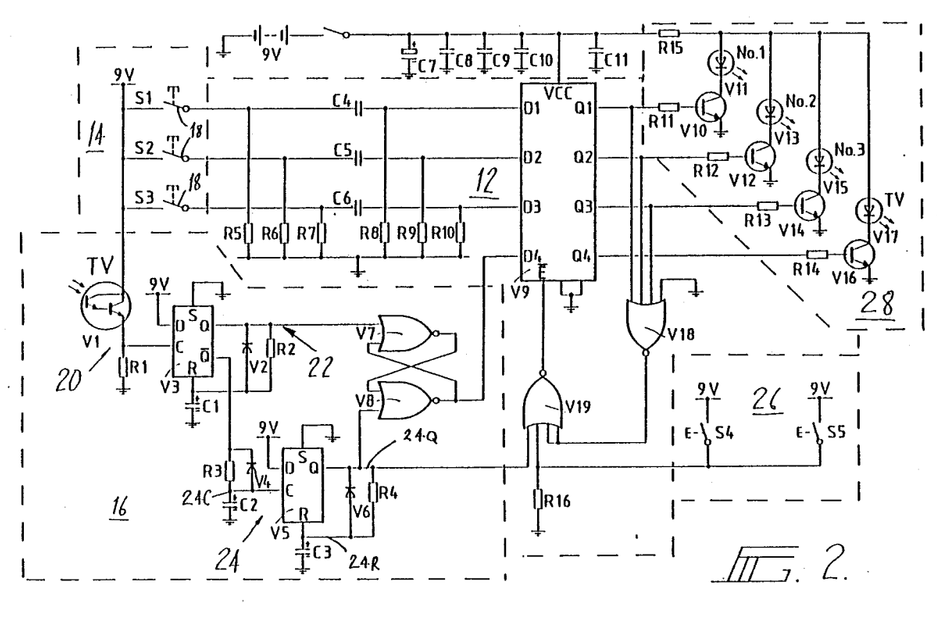
FIG. 2 is a circuit diagram corresponding to the block diagram of FIG. 1.

The sensor means 20 comprises a sensor V1 as shown in FIG. 2. The sensor V1 in the present embodiment is an optical type sensor such as a phototransistor, or more specifically, a darlington photo transistor, although it is envisaged that other optical sensors could be used.

The sensor V1 is housed in a mounting means (not shown) such as a suction cap. The sensor V1 is intended to be, in use, detachably fixed to a television screen. The sensor V1 is arranged, in use, to detect a change in the luminance of a portion of the television screen at which it is fixed.

The area of the television screen at which the sensor V1 is located is hereinafter referred to as a box, of the television screen. The width of the box is preferably of an order similar to the width of a line of the television screen as generated by an electron beam although it is to be understood that the box could have a width corresponding with more than one line of the television screen.

When the luminance in the box is low, indicating an absence of colour, such as when it is black, the sensor V1 provides a representation of a first condition.

Preferably, absence of colour is any signal in the box with a luminance component of less than 500 mV peak to peak with respect to synctip where a white level is measured as 1 V with respect to the synctip and black level is 300 mV with respect to synctip.

More preferably, absence of colour is any signal in the box with a luminance component of not more than 300 mV. When the luminance in the box is high, indicating a presence of colour, such as when it is white, the sensor V1 provides a representation of a second condition. Preferably presence of colour is any signal in the box with a luminance component greater than 700 mV.

Preferably, the detection of the colour by the sensor V1 is substantially independent of the hue or level of saturation of the signal in the box.

Preferably, the first condition corresponds to an inactive OFF state and the second condition corresponds to an active ON state.

The pulse detector 22 comprises a D-type flip flop V3 and an RS latch V7, V8 configured to produce an output at pin D4 of a D-type flip flop V9 of the adjudicator means 12. A clock input C of the flip flop V3 is driven by the sensor V1. The box of the television screen is scanned by an electron beam of the television, for example, once every 20 ms for a PAL system operating on 50 Hz.

Thus, if colour is present in the box the clock input C will have a pulse wave voltage of a period of 20 ms. Accordingly, while a reset input R of the flip flop V3 is inactive an output Q of the flip flop V3 will also have a voltage that is a pulse wave with the period of 20 ms corresponding to that of the clock input C.

In such a condition the pulse detector 22 detects that there is an activating signal present on the television screen adjacent the sensor V1 and alerts the adjudicator 12 accordingly.

The output Q of the flip flop V3 is connected to a reset combination comprising a capacitor C1, a resistor R2 and a diode V2. The capacitor C1 and the resistor R2 have such value as to have a time constant of approximately half of the period of the voltage waveform at the clock C and preferably half the field rate of the television. That is the time constant R2C1 is approximately 10 ms for the exemplary PAL system. Such a value is preferable to ensure that the flip flop V3 is reset every cycle of the clock C input so as to be ready to detect the luminance of the box for each field. The flip flop V3 is reset when the voltage of the reset R exceeds about half of the supply voltage, that is about 4.5 volts for a supply voltage of 9 volts.

Once the flip flop V3 is reset the voltage at the output Q goes low and the capacitor C1 is rapidly discharged via the diode V2.

The flip flop V3 is now ready to be clocked by the next scan of the electron beam, provided there is still a presence of colour in the box.

The RS latch V7, V8 produces a stable high output at the pin D4 of the flip flop V9 in response to the 20 ms period square wave at the output Q. That is, the RS latch V7, V8 produces a high output when the box is illuminated.

The flip flop V3 also comprises a $\bar{Q}$ output which is connected to the missing pulse detector 24. The output $\bar{Q}$ is connected to a clock combination comprising a capacitor C2, a resitor R3 and a diode V4.

The missing pulse detector 24 also comprises a D-type flip flop V5 having a clock input 24C, a reset input 24R and an output 24Q.

When the voltage at the output Q is low the voltage at the output $\bar{Q}$ is high and the capacitor C2 changes up via the resistor R3. The time constant of the capacitor C2, resistor R3 combination is preferably such that when the output Q remains low for greater than 10 ms, that is, when the box changes to the first state having an absence of colour, the capacitor C2 provides a logical high to the clock input 24C of the flip flop V5. The logical high at the clock input 24C produces a logical high at the output 24Q, which output resets the RS latch V7, V8 and thus presents a logical low to pin D4.

Simultaneously, the output 24Q of the missing pulse detector 24 sets the output of the NOR gate V19 to a low voltage and enables the flip flop V9, which now has all D inputs at a low voltage, and thus resets the adjudicator means 12.

The missing pulse detector 24 accordingly detects the absence of the activating signal at the sensor V1 and alerts the adjudicator means 12 accordingly.

Where the activating signal provides a visible base the time delay in detecting a transition to an OFF condition is quite long and it has been found that the time constant C2 R3 is preferably at least 500 ms to ensure that little or no false resetting of the RS latch V7, V8 may occur.

However, it has been found that where it is acceptable to have an activating signal which is not visible the box can be activated and deactivated at the field rate, that is at 50 Hz for a PAL system as compared to 3.81 Hz where visibility is desired. In such a case the time constant C2 and R3 may be set to about 15 ms, leaving a 5 ms error margin.

Where the output Q has a square wave voltage on it the capacitor C2 is discharged via the diode V4 once every scan of the television screen.

The flip flop V5, similarly to the flip flop V3, has a reset combination comprising a capacitor C3, a resistor R4 and a diode V6. The combination has a similar function to that associated with the flip flop V3. The capacitor C3 and the resistor R4 preferably have a time constant of such length as to provide an automatic reset function as described hereinafter.

It has been found that a time constant equal to that of time constant C1R2 is suitable, that is about 10 ms, so that where the capacitor C2 is allowed to charge for only about 10 ms the output 24Q is kept low and the capacitor C3 not allowed to charge up thus indicating that the box is still ON.

Where capacitor C2 is allowed to charge up for greater than about 15 ms the missing pulse detector 24 is triggered and the output 24Q is set high. That is when the box goes from an illuminated condition to a non-illuminated condition the output 24Q generates a reset pulse which represents to the adjudicator means 12 that the box has entered the first inactive OFF state. Then the capacitor C3 begins to change via R4 to reset the flip flop V5 and set the output 24Q to a low ready for further detecting.

The second event registering means 16 is in effect an interface between the television screen and the adjudicator means 12. The interface allows for the activation of a remote unit, such as, for example, the adjudicator, by an activating signal transmitted in a video transmission signal.

The interface may also be used to transfer data from, for example, a television broadcast studio to a remote unit linked by the interface to a television screen as described hereinafter.

The adjudicator 12 comprises a filter arrangement formed of resistors R5 to R10 and capacitors C4–C6. The filter arrangement connects the switches 18 of the first event registering means 14 to the flip flop V9. Switches S1, S2 and S3 are respectively connected via the filter arrangement to inputs D1, D2, and D3 of the flip flop V9.

The filter arrangement is intended to AC couple the switches 18 to the flip flop V9 so that closure of one or more of the switches 18 results in a relatively short voltage pulse at the respective input D1, D2 or D3. Such a short voltage pulse is preferred to register an event with the flip flop V9 of the adjudicator means 12. If such a filter arrangement were not incorporated a contestant may be able to jam the adjudicator means 12 by not releasing his or her switch 18.

The flip flop V9 also comprises outputs Q1 to Q4 and an enable input $\bar{E}$. The outputs Q1 to Q3 correspond to the inputs D1 to D3 and the switches S1 to S3, respectively and thus to the local contestants. The output Q4 corresponds to the input D4 and the senor V1 and thus to the remote contestant.

The adjudicator means 12 will accept logical high signals at the inputs D1 to D4 and respectively produce logical high signals at the outputs Q1 to Q4 provided the enable input $\bar{E}$ is set, that is, has a logical low voltage.

When the enable input $\bar{E}$ has a logical high voltage none of the inputs D1 to D4 are accepted and the present output status of the flip flop V9 is maintained.

The adjudicator means 12 also comprises two NOR gates V18 and V19. The NOR gate V18 has inputs preferably connected to the outputs Q1 to Q3.

The NOR gate V19 has inputs connected to the output of the NOR gate V18, the output 24Q of the second event registering means 16 and a manual reset means 26.

The NOR gates V18 and V19 serve to disable the flip flop V9 when the first one of the contestants registers his/her answer.

When any of the switches S1 to S3 is actuated, or the remote contestants actuate a similar switch (not shown) the first switch registered is received by the flip flop V9 and the corresponding output Q1 to Q4 goes to a logical high. The high output produces a low output at the NOR gate V18 and a high output at NOR gate V19. The NOR gate V19 output then sets a high voltage at the enable input $\bar{E}$ and thus disables the inputs D1 to D4. Thus, once one local switch 18 closure is received by the adjudicator means 12 all other switch closures are disregarded by the flip flop V9.

Where the remote contestant is first to be registered the flip flop V9 will set the output Q4 high and will wait for the first local contstant to also register an answer.

It is envisaged that the inputs of the NOR gate V18 could include a connection to the output Q4. Thus, the first contestant whether local or remote registered, will disable the inputs D1 to D4 of the flip flop V9. The outputs Q1 and Q4 are connected to a display means 28. The display means 28 comprises LED's V11, V13, V15 and V17 connected to be lit when a corresponding output occurs.

The activating signal may be coded in order to allow data transmission from a television broadcast station to the event adjudicator 10. The data may be either coded serially or in parallel.

In the latter case a plurality of second event registering means 16 corresponding to the number of bits in parallel coded data and any parity bits.

Figure 4:
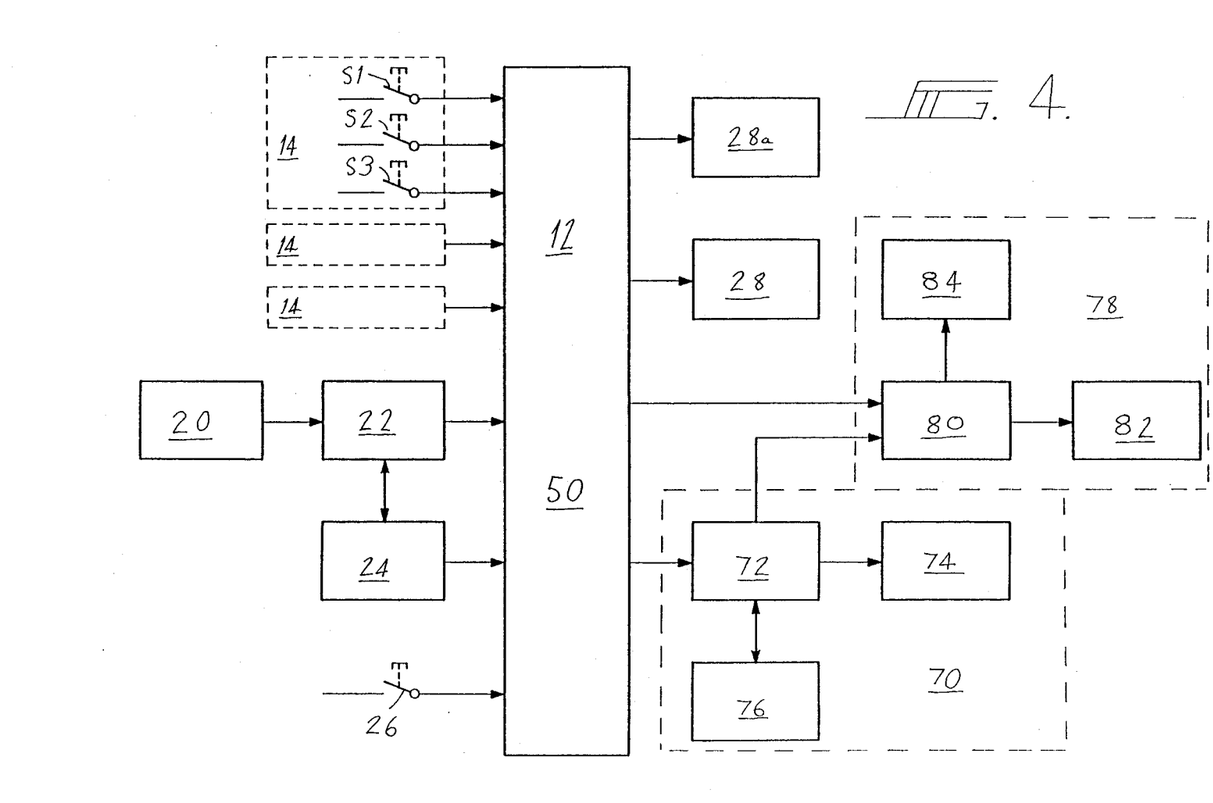
FIG. 4 is a block diagram of an enhanced event adjudicator similar to that of FIGS. 1 and 2.
Figure 6:
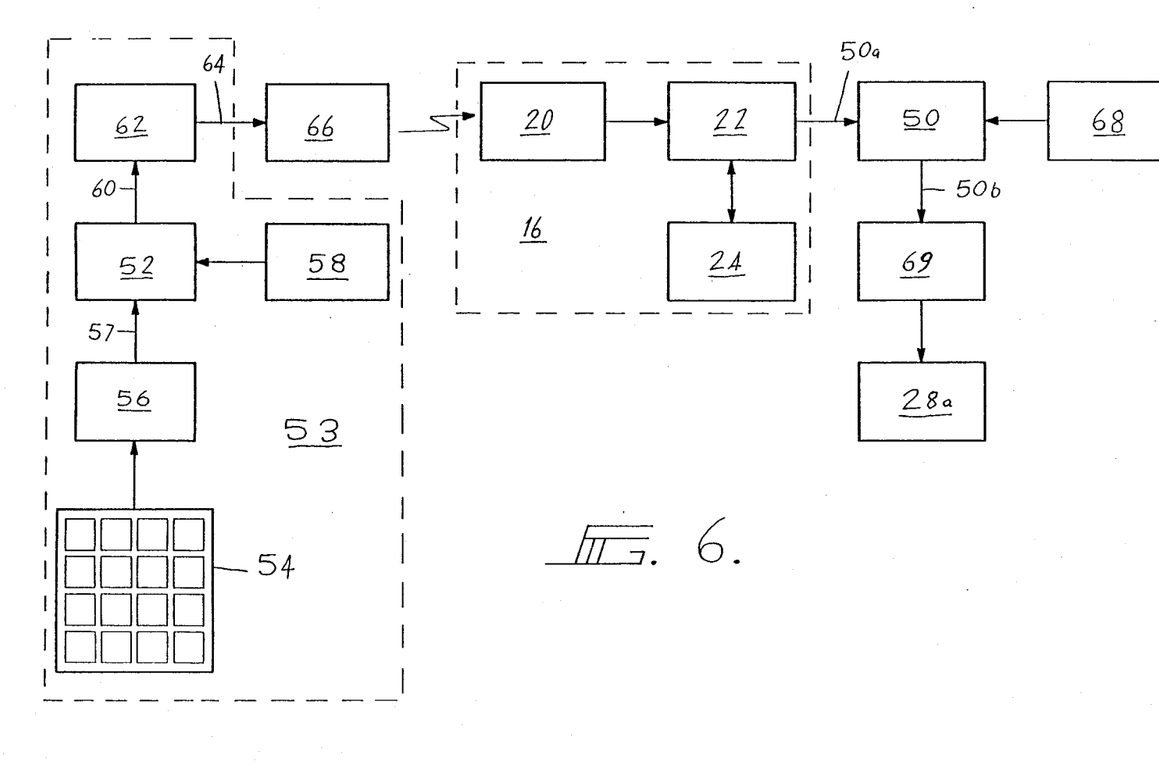
FIG. 6 is a block diagram of a data transmission/reception arrangement for use with the event adjucicator of FIGS. 1, 2 and 4.

In the former case a simple second event registering means 16 may be used and having its output connected to a Universal Asynchronous Receiver and Transmitter (UART) 50 shown incorporated with the adjudicator means 12 in FIG. 4 and also shown in the data transmission/reception arrangement of FIG. 6.

The UART 50 is operated in conventional manner to receive data bits from the second event registering means 16 and converting them to a parallel word for display, on a display means 28a, and the like.

Figure 3:
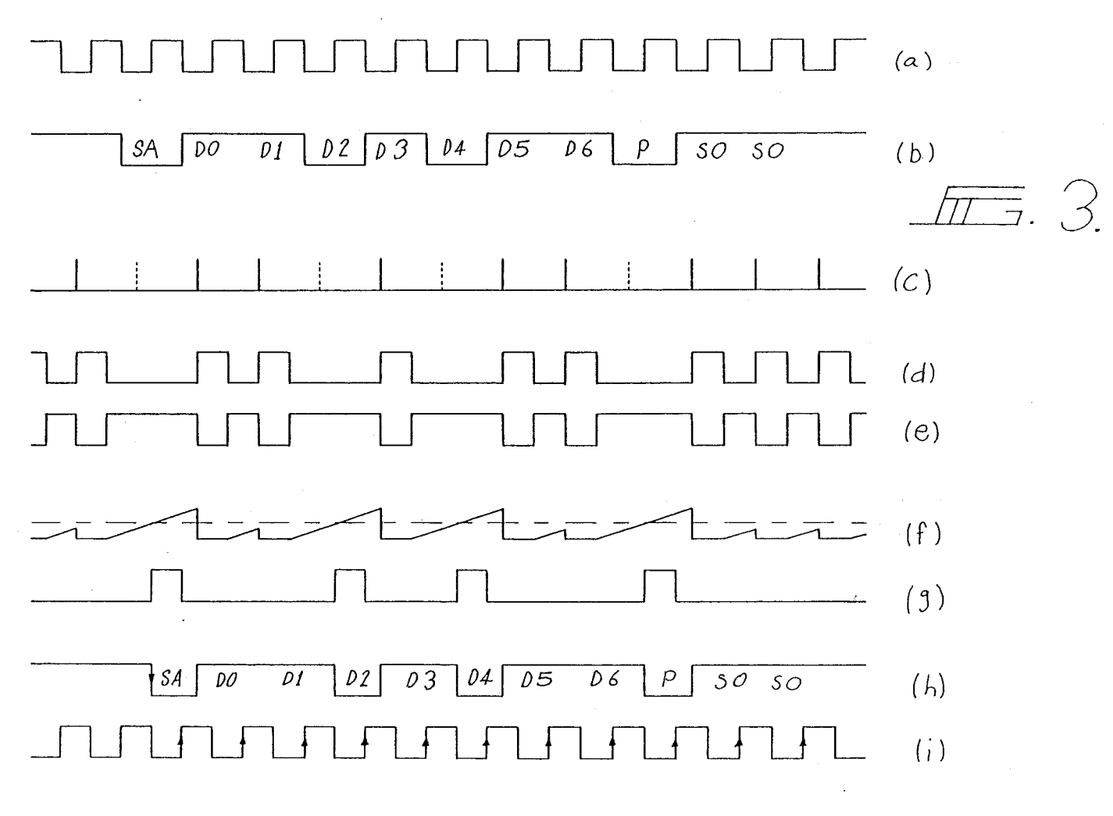
FIG. 3 is a timing diagram for the event adjudicator for the event adjudicator of FIG. 2 for a serially transmitted data stream.

In FIG. 3 there are shown waveform diagrams for the reception of the data word 6B Hex (1101011 binary).

The waveforms in FIG. 3 represent (a) internal transmit clock for an encoder UART 52 (FIG. 6) present at the television broadcasting station, (b) television screen data stream appearing at the sensor V1 during a period of time, (c) signal appearing at the clock input C of flip flop V3, (d) and (e) Q and $\bar{Q}$ outputs of flip flop V3, (f) clock input 24C at flip flop V5 (the dashed line representing trigger level), (g) reset pulse from missing pulse detector 24, (h) output from RS latch V7, V8 to the UART 50 and (i) internal receive clock for the UART 50.

In FIG. 6 there is shown a data transmission unit 53 for use with the apparatus 10 of the present invention. The transmission unit 53 comprises the encoder UART 52 is connected, for example, to a keyboard 54 via an encoder 56 and having a parallel input port 57 with an external clock generator 58. The UART 52 has a serial output port 60 which is connected to a pattern generator 62 configured to generate the above mentioned base.

The pattern generator 62 has an output 64 which is arranged to be broadcast or closed circuit transmitted to a television unit 66. The television unit 66 may be located locally to the transmission unit 53 or remotely, such as in a closed circuit therein network, or a television broadcast area or a satellite transmission zone or the like.

The television unit 66 displays the box as described hereinabove and a start bit SA followed by data bits D0 to D6, a parity bit and two stop bits so appear therein (FIG. 3b).

The sensor V1 sensors the and produces a series of pulses which appear at the clock input C as shown in FIG. 3c resulting in outputs Q and $\bar{Q}$ as shown in FIGS. 3d and 3e.

Where the output Q remains low for greater than about 15 ms the voltage rise at capacitor C2 (FIG. 3f) exceeds the trigger level and the missing pulse detector 24 is activated to reset the RS latch V7, V8 and apply a low signal to serial input 50a of the UART 50 under direction of a receive clock 68 having the same frequency as the transmit clock 58.

When all the start, data, priority and stop bits are accumulated by the UART 50 and the parity checked for data integrity the data is output at parallel output port 50b to the display 28a.

In FIG. 4 there is shown an enhanced event adjudicator 10 having both data reception and display and remote event adjudication. The event adjudicator 10 also comprises, in the enhanced form, a score means 70 to keep a tally of scores awarded for correct answers provided by a contestant found to be the first to register with the adjudicator means 12. The score means comprises a score encoder 72 driven by the adjudicator 12, a score display 74 and a local adjudicator 76 to adjust the scores in accordance with the correctness of the answer to the quiz question.

The event adjudicator 10 may also comprise a record means 78 having a data encoder 80 to encode the score and the identity of the corresponding contestant to be recorded, a printer 82 to provide a hard copy of the score, and a data output means 84 for interface to a computer or the like.

Figure 5:
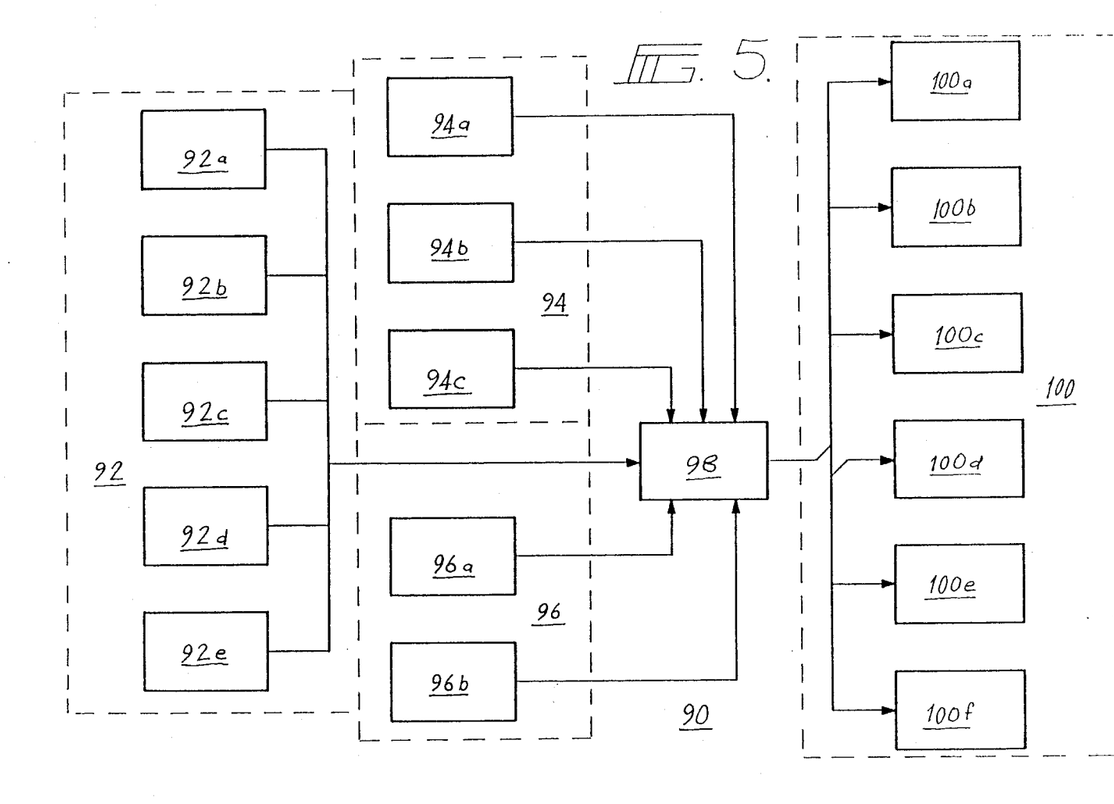
FIG. 5 is a block diagram of a data encoding a a distribuation system for use with the event adjudicator of FIGS. 1, 2 and 4.

In FIG. 5 there is shown a data encoding and distribution system 90 also suitable for use with the event adjudicator 10 of the present invention. The system 90 comprises a background video signal generator 92, a key signal means 94, a key controller 96, a video keyer 98 and a video record/transmission network 100.

The background video signal generator 92 may comprise a conventional vision mixer 92a, video tape recorder 92b, tuner 92c, computer 92d or a television camera 92e or the like, used to control the composite video signal forming the background of a screen video signal at the video keyer 98.

The key signal means 94 comprises a key source 94a configured to direct where and when the video keyer 98 is to cut the box in the background video signal. The key signal means 94 also comprise a key fill I 94b and a key fill II 94c configured to direct the vision mixer 92a to fill the box with a high luminance signal (white) and a low luminance signal (black) respectively. The key controller 96 comprises a computer 96a and a televisiion quiz show 96b. The key controller 96 controls which of the key fills 94b or 94c fill the box cut in the background video signal. Also the key controller 96 is arranged to provide field synchronised switching signals to the video keyer 98 when data is to be transmitted.

It is envisaged that data to be transmitted could comprise answers to the quiz questions transmitted either before the commencement of the quiz and stored in the event adjudicator 10 or transmitted as an announcer calls the question.

The video record-transmission network 100 comprises, for example, a television broadcast system 100a, a satellite system 100b, a closed circuit television system 100c, a cable television network 100d, a video tape recorder 100e and/or a television 100f.

It is envisaged that the key source 94a could be a Chroma, R.G.B. or Matt key signal developed by a colour or monochrome television camera.

Also, it is envisaged that the box could be superimposed using a frame accurate edit system such as a computer aided video tape edit system.

In use, the event adjudicator 10 of the present invention is arranged in conjunction with a communication medium such as shown in FIGS. 5 and 6. The event adjudicator 10 adjudicates a contest between local contestants, for example, contestants in a home, with respect to a remote contestant, for example a group of contestants in a contest broadcast over a television broadcasting system or the like.

The contest is broadcast with information relating to the actuation of switches, or the like, used by the remote contestants to register an answer to a question, such as a question in a quiz television program.

Preferably, the information is broadcast as a small box on the television screen that can be illuminated or darkened independently of the remainder of the television picture.

Preferably, the location of the box on the screen is fixed so that in use, the sensor V1 can be fixed to the television screen adjacent the box.

It is intended that when a remote contestant actuates a switch to answer a question there is simultaneously broadcast a signal of high luminance (greater than 700 mV) to correspond with the box fixed to the television screen.

The highly luminous signal corresponding to the box is detected by the sensor V1. The sensor V1 produces a voltage at its output, which voltage triggers the second event registering means 16.

The second event registering means 16 then provides an active output to the adjudicator means 12.

When the luminance content of the signal in the box is high the second event registering means 16 indicates to the adjudicator means 12 that a remote contestant has actuated his/her switch or that a contest time out is in progress. Meanwhile, a local contestant having received the question at the same time as the remote contestants via the television broadcast may also attempt to register with the first event registering means 14 by actuating his switch S1, S2 or S3. When one of the switches S1, S2 or S3 is actuated a voltage pulse appears at a corresponding input D1, D2 or D3 at the flip flop V9 via the filter arrangement.

Provided the flip flop V9 is enabled the flip flop V9 will accept the signal at its inputs D1 to D4 and produce an output. The output produced depends on which input receives a signal first.

If, one of inputs D1 to D3 register the first signal a corresponding output Q1 to Q3 goes logically high, a corresponding LED V11, V13 or V15 is illuminated and NOR gates V18 and V19 operate to disable the inputs of the flip flop V9.

Thus, if one of the local contestants is first to be registered the adjudicator means acts to disregard subsequent input signals from the registering means 14 or 16.

If one of the remote contestants is registered first the output Q4 becomes logically high and the LED V17 of the display means 28 is illuminated. The flip flop V9 is then reset by closure of a reset switch S4 or S5 of the reset means 26 or by the missing pulse detector 24 as described hereinabove.

Once one question has been answered the flip flop V9 is either reset by the missing pulse detector 24, as described hereinabove or by the reset means 26.

It is envisaged that the remote contestants could be a plurality of groups of remote contestants, in which case a corresponding plurality of sensors and boxes spaced about the television screen could be used. It is envisaged that an adjustable time delay means be provided to compensate for time lapsed in communication of the remote contestants switch actuation.

It is also envisaged that the second registering means 16 could be sensitive to an audio signal transmitted by the broadcasting television station and received by the television.

It is further envisaged that information relating to the box could be transmitted by a television broadcasting station as a page of teletext, in particular a caption page of teletext. In such manner, a television receiver with a teletext decoder could be used to receive the information relating to the box. Thus, the coded teletext information could be used to trigger the second event registering means 16.

It is still further envisaged that coded information relating to the box could be presented at a television receiver in the vertical interval block of the television screen.

It is still further envisaged that the event adjudicator 10 of the present invention could be used in relation with a pre-recorded video program such as a video program recorded on a video cassette and played back on a video cassette recorder/player.

Modifications and variations such as would be apparent to a skilled addressee are deemed wtihin the scope of the present invention. For exampe, the event adjudicator 10 could be adapted to allow for any number of local or remote contestants. Also the event adjudicator 10 could be used by only local contestants.

I claim:

1. An event adjudicator for adjudicating which event of a plurality of local and remote events occurred first, such as in a television quiz program, the event adjudicator comprising:
   (a) a first event registering means having a plurality of switches disposed to be actuated by participants to register the local events;
   (b) at least one second event registering means for registering the remote events and having:
      (i) an optical type sensor means arranged to be detachably attached to a television screen of a television unit to detect changes in the luminance of a portion thereof associated with the remote events;
      (ii) a pulse detector connected to the sensor means to detect changes in the luminance of said portion, the pulse details having at an output an active signal when the sensor means detected high luminance;
      (iii) a missing pulse detector connected to the pulse detector, the missing pulse detector having at an output an active signal when the sensor means detects low luminance for a continuous period of time greater than half the period of the field rate of the television unit, the missing pulse detector being connected to the pulse detector to reset same upon such detection of low luminance;
   (c) an adjudicator means having:
      (i) an edge triggered flip flop having a plurality of inputs and outputs in equal numbers, one of said inputs being connected to the output of the pulse detector of the corresponding one of the or each second event registering means to adjudicate the or each remote event;
      (ii) a plurality of filter means connected between said switches and the remainder of said inputs to AC couple said inputs to convert the registered local events into short duration electrical signal to adjudicate said local events and
      (iii) a logic gate connected to at least said outputs corresponding to said switches, the logic gate being connected to inhibit the edge triggered flip flop upon the occurrence of one of the local events; and
   d. a display means connected to each of the said outputs to indicate when said outputs become active.

2. An event adjudicator according to claim 1, in which the output of the missing pulse detector is also connected to reset said edge triggered flip flop at detection of low luminance by the sensor means for a period greater than about half of the period of said field rate.

3. An event adjudicator according to claim 1, in which the pulse detector comprises a reset combination to enable detection of the luminance of the portion for each field of a picture of the television unit.

4. An event adjudicator according to claim 1, comprising a plurality of said sensor means configured to sense an encoded video actuating signals at a plurality of said portions, and a decoder means to decode the sensed video actuating signals.

5. An event adjudicator according to claim 1, in which the sensor means is configured to sense a video signal produced from a page or caption of teletext decoded by a teletext decoder of the television unit.

6. An event adjudicator according to claim 1, in which the sensor means is configured to sense a video signal produced in the vertical interval block of the screen of the television unit.

7. An event adjudicator for adjudicating which event of a plurality of local and remote events occurred first, such as in a television quiz program, the event adjudicator comprising:
   (a) a first event registering means having a plurality of switches disposed to be actuated by participants to register the local events;
   (b) at least one second event registering means for registering the remote events and having:
      (i) an optical type sensor means arranged to be detachably attached to a television screen of a television unit to detect changes in the luminance of a portion of said television screen to produce an electrical signal corresponding thereto, the changes in luminance being associated with a video actuating signal received by the television unit in a television signal;
      (ii) a pulse detector having an edge triggered flip flop connected to the sensor means to detect the electrical signal corresponding to the video actuating signal, a reset combination configured to reset an output of the edge triggered flip flop at about half the period of the field rate of the television unit to allow for detection of said electrical signal for each field of a picture of the television unit, and an electronic latch means connected to said output to provide an active signal at its output upon detection of high luminance by the sensor means to register remote events; and
      (iii) a missing pulse detector having a further edge triggered flip flop connected to the pulse detector via a RC timing circuit, the RC timing circuit being configured to trigger the further edge triggered flip flop when the output of said edge triggered flip flop remains inactive for greater than about half the period of the field rate to provide an active signal at its output upon detection of low luminance by the sensor means to reset the electronic latch means, and a further reset combination configured to reset the further edge triggered flip flop at about the half the period of the field rate of the television unit to reset the further edge triggered flip flop upon such detection of low luminance;
   (c) an adjudicator means having:
      (i) a still further edge triggered flip flop having a plurality of inputs and outputs in equal number, one of said inputs being connected to the output of the electronic latch means of a corresponding one of the or each second event registering means to adjudicate the or each remote event;
      (ii) a plurality of filter means corresponding in number with the plurality of switches of the first event registering means and connected between said switches and the remainder of said plurality of inputs, each filter means being configured to provide AC coupling to convert the registered local events into short duration electrical signals to adjudicate same; and (d) a display means connected to each output of the still further edge triggered flip flop to indicate when same became active;

the output of the missing pulse detector also being connected to reset said still further edge triggered flip flop at detection of low luminance by the sensor means for a period greater than about half the period of said field rate.

* * * * *